(12) United States Patent
Vincent et al.

(10) Patent No.: US 6,639,709 B2
(45) Date of Patent: Oct. 28, 2003

(54) MATRIX ADDRESSABLE ELECTROCHROMIC DISPLAY DEVICE

(75) Inventors: John B. Vincent, Midland, MI (US); Derrick W. Flick, Midland, MI (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 10/102,491

(22) Filed: Mar. 19, 2002

(65) Prior Publication Data

US 2002/0171907 A1 Nov. 21, 2002

Related U.S. Application Data

(60) Provisional application No. 60/277,030, filed on Mar. 19, 2001.

(51) Int. Cl.[7] .................................................. G02F 1/15
(52) U.S. Cl. ........................ 359/265; 359/270; 359/271; 359/273; 359/269
(58) Field of Search ............................... 359/265, 267, 359/270, 273, 275, 266, 269, 271; 345/105

(56) References Cited

U.S. PATENT DOCUMENTS

| 3,280,701 A | 10/1966 | Donnelly et al. ........... 359/267 |
| 3,806,229 A | 4/1974 | Schoot et al. ............... 359/273 |
| 3,827,784 A | 8/1974 | Giglia et al. ................ 359/275 |

(List continued on next page.)

FOREIGN PATENT DOCUMENTS

| EP | 0 301 513 | 1/1989 |
| EP | 796510 | 4/1999 |
| EP | 1043621 A1 | 9/2000 |
| JP | 1134429 | 5/1989 |

OTHER PUBLICATIONS

"Electrochromic Display Device and Compositions Useful in Making Such Devices" filed in the United States of America on Mar. 19, 2001; application Ser. No.: 60/277,030.
"Thermal and Optical Behavior of Electrochromic Windows Fabricated With Carbon–Based Counterelectrode"; Electrochemical Acta., 44 (1999) 3211–3217; Nishikitani, Y., et al.
"Electrochromic Display Device and Compositions Useful in Making Such Device" filed in the United States of America on Mar. 19, 2002; application Ser. No.: 10/102236.
"Electrochromic Display Device" filed in the United States of America on Mar. 19, 2002; aplication Ser. No. 10/102, 535.
Coleman, et al., "Printed, flexible electrochromic displays using interdigitated electrodes" Solar Energy Materials & Solar Cells 56 (1999) 395–418.
M. Brandon and B.P. Piggin, "Front Face Electrochromic Display", IBM Technical Disclosure Bulletin, vol. 21, No. 5, Oct. 1978, 2047.
Patent Abstract of Japan, vol. 18, No. 510, Sep. 26, 1994, JP 06 175165 A.

*Primary Examiner*—Loha Ben
*Assistant Examiner*—M. Hasan

(57) ABSTRACT

The invention is a matrix addressable electrochromic display device comprising a top electrode structure comprising at least one transparent or semi-transparent and substantially ionically isolative, electrically conductive electrode, a bottom electrode structure comprising at least one substantially ionically isolative, electrically conductive electrode, wherein at least one of the top or bottom electrode structures comprises two or more of said electrodes and the top and bottom electrode structures are positioned to form at least two separate regions where the top electrodes are positioned above the bottom electrodes and between the top electrode structure and the bottom electrode structure is positioned an active layer comprising an electrolyte and an electrochromic material.

20 Claims, 1 Drawing Sheet

U.S. PATENT DOCUMENTS

| | | | |
|---|---|---|---|
| 4,041,481 A | * 8/1977 | Sato | 345/107 |
| 4,129,861 A | 12/1978 | Giglia | 345/49 |
| 4,146,876 A | 3/1979 | Arellano et al. | 340/105 |
| 4,175,836 A | 11/1979 | Redman et al. | 359/271 |
| 4,175,838 A | 11/1979 | Randin | 359/270 |
| 4,297,005 A | 10/1981 | Johnson, Jr. et al. | 359/272 |
| 4,349,818 A | * 9/1982 | Kaneko et al. | 345/107 |
| 4,488,781 A | * 12/1984 | Giglia | 359/271 |
| 4,547,046 A | * 10/1985 | Muramatsu et al. | 359/271 |
| 4,550,982 A | 11/1985 | Hirai | 359/274 |
| 4,712,879 A | 12/1987 | Lynam et al. | 359/275 |
| 4,810,067 A | 3/1989 | Demiroyont | 359/265 |
| 5,189,549 A | 2/1993 | Leventis et al. | 359/271 |
| 5,225,582 A | 7/1993 | Mason | 556/423 |
| 5,413,739 A | 5/1995 | Coleman | 252/511 |
| 5,444,330 A | 8/1995 | Leventis et al. | 313/506 |
| 5,457,564 A | 10/1995 | Leventis et al. | 359/271 |
| 5,545,291 A | 8/1996 | Smith et al. | 438/107 |
| 5,561,206 A | 10/1996 | Yamamoto et al. | 526/256 |
| 5,679,283 A | 10/1997 | Tonar et al. | 252/583 |
| 5,708,123 A | 1/1998 | Johannsen et al. | 528/229 |
| 5,818,636 A | 10/1998 | Leventis et al. | 359/273 |
| 5,852,509 A | 12/1998 | Coleman | 359/271 |
| 6,118,573 A | * 9/2000 | Kubo et al. | 359/266 |
| 6,136,468 A | 10/2000 | Mitchell, Jr. et al. | 429/110 |
| 6,183,878 B1 | 2/2001 | Berneth et al. | 428/583 |
| 6,232,019 B1 | 5/2001 | Wunder et al. | 429/300 |
| 6,241,916 B1 | 6/2001 | Claussen et al. | 252/583 |
| 6,248,263 B1 | 6/2001 | Tonar et al. | 252/583 |
| 6,266,177 B1 | 7/2001 | Allemand et al. | 359/265 |
| 6,277,307 B1 | 8/2001 | Berneth et al. | 252/583 |
| 6,288,825 B1 | 9/2001 | Byker et al. | 359/265 |
| 6,294,111 B1 | 9/2001 | Shacklett, III et al. | 252/518.1 |
| 6,302,986 B1 | 10/2001 | Toya et al. | 156/109 |
| 6,327,069 B1 | 12/2001 | Allemand et al. | 359/265 |

* cited by examiner

MATRIX ADDRESSABLE ELECTROCHROMIC DISPLAY DEVICE

CROSS-REFERENCE TO RELATED APPLICATION

This application claims the benefit of U.S. Provisional Application No. 60/277,030, filed on Mar. 19, 2001.

FIELD OF INVENTION

This invention relates to electrochromic display devices.

BACKGROUND OF THE INVENTION

Electrochromic display devices have been used to display data in various formats. When the display device incorporates a number of electrochromic elements in a two-dimensional matrix configuration, the individual electrochromic elements typically are arranged in a manner suitable for multiplex addressing. However, alternate current paths are created which result in undesired coloration or bleaching of electrochromic elements adjacent to an electrochromic element sought to be colored or bleached, an effect commonly referred to as cross-talk. Attempts have been made to deal with the cross talk problem. For example, U.S. Pat. No. 4,129,861 discloses the use of diode elements to increase the threshold voltage of each electrochromic element. However, in order to use multiplex addressing in such an arrangement, each electrochromic element must be provided with such a diode means, which of course, increases the cost and complexity of the device.

Other attempts to deal with the cross-talk problem require separate and distinct electrochromic layers and electrolyte layers. Additionally, discrete pixels are created by separating one electrochromic material and/or one electrolyte in a discontinuous series of confined units within a device. U.S. Pat. No. 4,488,781 addresses the problem of cross-talk by depositing an electrochromic inorganic layer on top of a glass sheet. The glass sheet contains a transparent electrical conductor. Both the electrochromic layer and the glass sheet are patterned into rows. The rows are spaced apart from one another. Columns of an ionically conductive material are criss-crossed with the rows. The columns are spaced apart from one another at a uniform distance. In that invention, the electrolyte is thus present in a discontinuous manner.

U.S. Pat. No. 5,189,549 describes an array having a sandwich configuration. Electrodes are patterned onto substrates to create rows and columns. An electrochromic material is deposited on the electrodes. This creates discrete blocks or lines of electrochromic material. The electrochromic material is distinct from a separate electrolyte layer. The electrolyte layer is preferably identified as a solid electrolyte sandwiched between the electrodes. The electrolyte preferably is also discrete blocks or lines but may be continuous. The authors also teach coating the entire length of the electrode strips with the electrochromic material. While coating the entire strip provides greater simplicity in manufacture, the authors note that some immunity to cross-talk is lost.

The use of two separate layers for the electrochromic material and the electrolyte along with the requirement of confined electrochromic units complicates the manufacture of these devices. Additionally, use of a solid electrolyte reduces switching speed. That is because ions move relatively slowly through solid electrolytes. Moreover, use of separate electrochromic and electrolyte layers also decreases switching speed. The separate electrochromic layer acts as a capacitor that is in series with the resistive, ion conductive layer, as modelled in Nishikitani, Y. et. al., *Electrochemical Acta*, 44 (1999) 3211–3217. Thus, a configuration using separate layers requires that an ion must be injected from the conductive electrolyte layer into a capacative electrochromic layer. Accordingly, there is a need for matrix addressable electrochromic devices with fast switching speeds, that are easily manufactured and have minimal or no problems with cross-talk.

SUMMARY OF THE INVENTION

The present invention is directed at devices that satisfy the identified deficiencies. Applicants have developed a class of matrix addressable electrochromic devices to display images using a single transparent conducting substrate and a continuous active layer comprising both an electrolyte and an electrochromic material. The resistance of the active layer is greater than the resistance of the transparent substrate. The devices of this invention possess one or more of the following benefits: use of optically transparent electrically conductive; ionically isolative top electrodes; faster switching times; use of electrochromic materials that are formulated directly into an ionically conductive active layer and which can be applied in a single, continuous layer; and non-linear optoelectric response to current over time which further reduces cross-talk.

According to one embodiment, the invention is a matrix addressable electrochromic display device comprising a top electrode structure comprising at least one transparent or semi-transparent and electrically conductive electrode, a bottom electrode structure comprising at least one, electrically conductive electrode, wherein at least one of the top or bottom electrode structures comprises two or more of said electrodes and the top and bottom electrode structures are positioned to form at least two separate regions where the top electrodes are positioned above the bottom electrodes and between the top electrode structure and the bottom electrode structure is positioned an active layer comprising an electrolyte and an electrochromic material.

In a second embodiment, the invention is the device of the first embodiment wherein the active layer further comprises (a) a non-aqueous compound that undergoes an electron transfer reaction with a subsequent change in its protic state resulting in a pH gradient in the device, (b) at least one indicator dye, and (c) a charge transport material.

These and other features, aspects and advantages of the present invention will become better understood with regard to the following description, appended claims and accompanying drawings.

DETAILED DESCRIPTION

An electrochromic material is defined as any material or group of materials that can undergo a visible color change upon application of an electric field.

An electrolyte is defined as any material that conducts ions, i.e. is ionically conductive.

As used herein, an "active layer" comprises an electrochromic material mixed with an electrolyte. The active layer is ionically conductive.

A pixel is defined as the intersection point between rows patterned on the top electrode and criss-crossed positioned columns on a bottom electrode thus defining the smallest addressable unit of a display device. As used herein the term is not to be construed to be limited in size or shape.

Although the terms "row" and "columns" are used to describe the arrangement of the electrodes, these terms are arbitrary and interchangeable.

Figure 1:
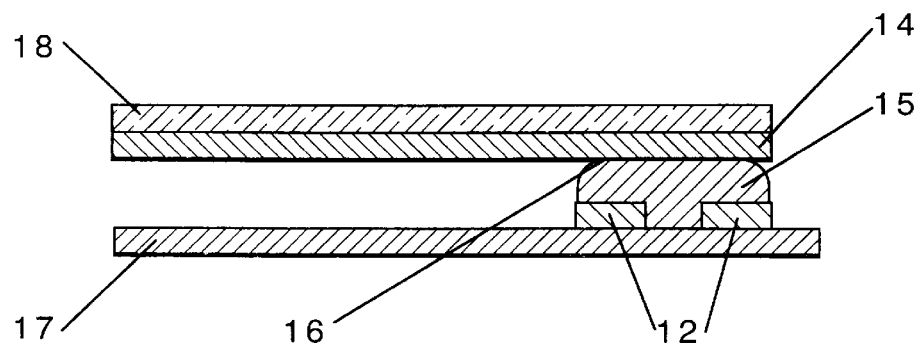
FIG. 1 is a schematic of a preferred embodiment of the present invention.
Figure 2:
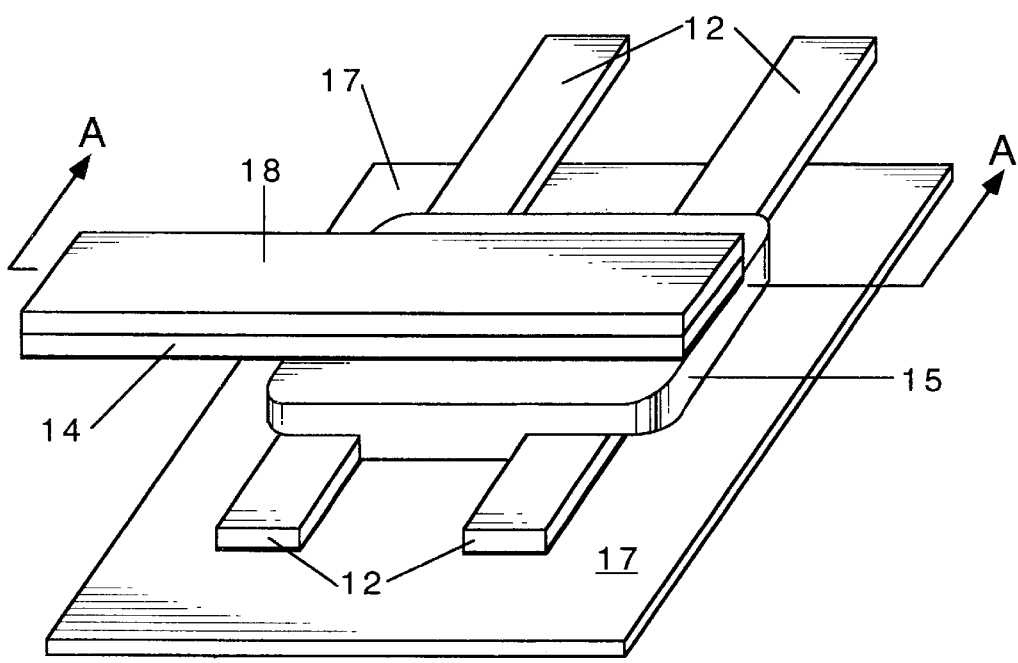
FIG. 2 is a cross section of the device of FIG. 1 taken through plane A—A

Referring to FIGS. 1 and 2, a preferred device 10 has a bottom substrate 17 patterned with linear rows 12 using an, ionically isolative, electrically conductive material as previously described. A transparent top substrate 18 which contains columns 14 of a transparent electrically conductive, ionically isolative material 15 makes up the viewable portion of the display device. The ionically conductive, active layer 15 is placed beneath the transparent viewable top electrode 14 and a top substrate 18. To color a pixel 16, a voltage is applied across a row and a corresponding column. If no cross-talk occurs, the pixel will activate at only the crossover point.

The top electrode must be transparent because the display image created by the electrochromic color change is viewed through it. Examples of transparent conductors that could be used as the top viewable electrode material include indium tin oxide (ITO), tin oxide, antimony tin oxide (ATO) or any other transparent metal oxide, as well as thin transparent films of metals or metal alloys such as gold, chrome, or platinum (either of which may optionally be coated with a protective barrier, such as titanium dioxide or derivative, silicon dioxide or derivatives or any conductive polymers and their derivatives, including but not limited to: poly(3, 4-ethylenedioxythiophene) (PEDOT), polyanline, polythiophene, polypyrrole, and polyphenylenevinylene (PPV). A transparent conducting polymer could also be used alone as the electrode, as long as the resistivity is low enough to provide adequate current flow to color the device. Transparent metal and metal oxide filled polymers such as indium tin oxide and antimony tin oxide, filled into a curable polymer such as an polyacrylate or polyurethane may be employed as well. These transparent conductive materials frequently have resistances on the order of 10 to 3000 Ohms per square.

The bottom electrode can be any conducting material which may or may not be transparent including: metals, metal oxides, metal or metal oxide-filled polymers such as tin oxide, antimony-tin oxide, indium-tin oxide, silver, graphite and conductive filled polymers, or other conductive inks. Inks and/or polymer systems could, be printed or applied using traditional methods such as blade coating, stenciling, spin coating, etc., or could be applied as a pattern via conventional drum printing, screen printing, or ink jet printing. A combination of materials may also be used to enhance current distribution. For example, a ring of a more conductive metal or other highly conductive material may surround the electrode in order to improve current distribution across the electrode surface. In addition, layering of different conducting materials may be used to optimize conductivity and limit reactivity and/or galvanic activity. It is preferred that the layer in contact with electrochromic materials be inert (i.e. materials such as graphite or carbon, properly doped metal oxides, or noble metals such as gold or platinum).

In the electrochromic device architecture described in FIG. 1, either oxidation or reduction is believed to occur primarily at the interface between the first visible electrode and the active layer and a color change becomes visible at that interface. The opposite reaction, reduction or oxidation is believed to occur primarily in the region at the interface between the active layer and the bottom electrode.

The electrochromic material mixed with the electrolyte in the active layer may be any known electrochromic material such as for example tungsten oxides, molybdenum oxides, niobium oxide, prussian blue, iridium and nickel oxides, viologens and their derivatives, as well as electrochromic polymers, including, polyanaline, polypyrrole, poly(isonapthalene), polythiophene and rare-earth diphthalocyanine complexes. The electrolyte material mixed with the electrochromic material to form the active layer may be any known conducting electrolyte such as aqueous, non-aqueous, and mixed aqueous-non-aqueous salts (i.e. a co-solvent). The co-solvent may be useful to enhance component solubility, modify conductivity, modify rheology of the composition and modify adhesion to the surface of the electrode layer. Potentially useful co-solvents include, but are not limited to: alcohols such as isopropanol and ethanol, aldehydes, ketones, ethers, formamides, or common electrochemical solvents such as acetonitrile, N-methylpyrolidinone, and propylene carbonate. Co-solvents with high dielectric constants and high reduction potentials (i.e., low electroactivity and low protic activity such as propylene carbonate) are particularly preferred.

The electrochromic material and electrolyte may be mixed by any known method of mixing materials in the chemical arts.

To prevent cross-talk or coloration of nearby pixels, the current path must flow along the row and then cross to a corresponding column only at the point of intersection. If the conductivity of the active layer is greater than the top transparent electrode, the current path may flow throughout the active layer at points other than the point of intersection. This can cause coloration along the entire row the transparent electrode or at nearby pixels surrounding the point of intersection. Consequently, it is required that the resistance of the active layer must be greater than the resistance of the transparent top electrode.

The required resistivity of an ionically conducting, electrically isolative active layer is preferably no less than about 1,000 Ohms/cm. It is more preferred that the resistivity of the active layer be greater than 10,000 Ohms/cm. It is most preferred that the resistivity of the active layer be greater than 25,000 Ohms/cm. The resistivity of the active layer is preferably greater than 20 times, more preferably greater than 50 times, and most preferably greater than 100 times the resistivity of the top transparent electrode.

The electrolyte may be any known ion transporting material. Suitable electrolytes are set forth in regard to the preferred active layer discussed hereinafter. Preferably the active layer is characterized by having a non-linear optoelectronic response. For a material with a linear optoelectronic response, if 90% of the current administered to a desired pixel reaches the pixel but 10% reaches an undesired pixel, the 10% of the current will cause a color change in the undesired pixel. In a material with a non-linear optoelectronic response an undesired pixel which is carrying 10% of the current would not necessarily change color because the small amount of current would be insufficient to trigger the electrochromic reaction(s).

Preferred active layers displaying the desired non-linear optoelectronic response are the compositions described in a co-pending application Ser. No. 10/102,236, having Attorney Docket No. 61465A which is expressly incorporated by reference herein. The composition may take the form of several embodiments.

In a first embodiment, the composition comprises (a) a non-aqueous compound that undergoes a reversible electron transfer reaction with a subsequent change in its protic state resulting in a pH gradient in the device, (b) at least one indicator dye, and (c) a charge transport material.

According to a second embodiment, the composition comprises component (a) a compound that undergoes an electron transfer reaction with a subsequent change in its protic state, (b) at least one indicator dye which changes color when a change in pH occurs, and (c) an ionically conductive material. The composition optionally further comprises component (d) a matrix material. Components (a), (b), (c), and (d) are different from one another. Component (a) preferentially undergoes an electron transfer reaction when a charge is applied to the composition. Additionally, if component (c) is a fluid, the composition further comprises the matrix material component (d). An opacifier component (e) and/or a secondary redox couple (f) are added in more preferred embodiments.

The first component (a) of the composition is any compound that undergoes a reversible redox (i.e. electron transfer) reaction, such that a pH change occurs in the region surrounding the compound, i.e., component (a) generates protons, hydroxide ions, or other components that cause a pH shift as a result of a redox reaction. Component (a) should preferentially undergoes the electron transfer or redox reaction in the cell. The term preferentially undergoes the electron transfer reaction means that the electron transfer or redox reaction primarily occurs on a particular component and/or its redox couple (if any) and redox reactions involving other components are insignificant. Preferably 70%, more preferably 80%, and most preferably more than 90% of the redox reactions occurring within the composition occur on component (a) and/or its redox couple. While some redox reactions may occur with some other components, such reactions with other components occur at a significantly lower rate, later in the life of a device and are considered side reactions. The reaction electron transfer or redox reaction should occur at the interface of component (a) with the electrode surface.

There are a number of ways to determine or approximate whether a component will preferentially undergo the redox reaction relative to the other components. In one embodiment, the standard reduction potential of component (a) should be less than for the other components in the device. Alternatively, the electrode potential, E, of component (a) is less than the electrode potential for the other components of identical sign in the half-cell reaction, as described by the Nernst equation. The Nernst equation links the actual reversible potential of an electrode, E, to the standard or idealized reduction potential, $E^0$, according to the following equation:

$$E=E^0-(RT/zF)\ln(a(RED)/a(OX)),$$

where R is the universal gas constant, T is the absolute temperature, z is the charge number of the reaction at the electrode surface, and F is the Faraday constant. The notation a(RED) represents the chemical activities of all reduced species at the cathodic electrode surface, while a(OX) represents the chemical activities of all oxidized species at the anodic electrode surface. If component (b) does not participate in the redox reaction at the counter electrode under the applied voltage conditions (i.e. E(species)<E(applied)), the secondary redox couple, component (f), may be added to complement component (a), serving as the secondary half-cell reaction. If component (b) is irreversible or quasi-reversible, component (f) may be added to prevent component (b) from participating in the half cell reaction. Therefore, it is preferred that the electrode potential of component (f) be closer to zero that that of component (b), assuming they are of the same sign. If component (b) is the same sign as component (a), it is preferred that the electrode potential of species component (a) be closer to zero than that of component (b).

Another method of determining which component will preferentially undergo the electron transfer reaction can be depicted by CV cyclability curves for each electroactive component. Measured (as opposed to calculated) values of the oxidative and reductive peaks of the individual components, as well as repeated cyclability (i.e. change in current versus number of cycles) serve as a simple means to define reaction preference at each electrode surface, as well as determine the electrochemical stability of the entire system, respectively. Electrochemical stabilization of the indicator dye is important when the dye undergoes irreversible or quasi-reversible redox reaction.

Examples of compounds suitable for use as the first component (a) may include but are not limited to any number of organic or inorganic redox reagents, including but not limited to: iodates, bromates, sulfates, metal hydroxides, phosphates, ketones, aldehydes, quinones, quinolines, sulfur compounds, hydroxybenzenes, carboxylic acids, polyoxometallates, and amines. Materials such as hydroquinone and other quinone derivatives such as methylquinone and duroquinone, which are highly reversible, do not undergo many side reactions, and have a relatively low standard reduction potential are particularly preferred. Component (a) is preferably present in amounts of greater than 0.01 percent, more preferably greater than 0.1 percent based on total weight of the composition. Component (a) is preferably present in amounts less than about 15 percent, more preferably less than about 10 percent, based on total weight of the composition. All percentages herein are weight percents based on total weight of the composition, unless explicitly indicated otherwise.

In addition to component (a), component (f) is preferably added as a secondary redox couple which would undergo complimentary redox reaction. A complimentary redox reaction is defined as the material which undergoes the second half of the redox reaction (i.e. one of the preferential half reactions at the electrode surface). Furthermore, component (f) should be reversible (electrochemically) and chemically stable in the system. Examples of compounds suitable for use as the secondary redox couple (f) may include but are not limited to any number of organic or inorganic redox reagents, including but not limited to: iodates, bromates, sulfates, metal hydroxides, phosphates, ketones, aldehydes, quinones, quinolines, sulfur compounds, hydroxybenzenes, carboxylic acids, polyoxometallates, and amines. Materials such as hydroquinone and other quinone derivatives such as methylquinone and duroquinone, which are highly reversible, do not undergo many side reactions, and have a relatively low standard reduction potential are particularly preferred. When used, component (f) should be present concentration ranges equal to those used in component (a) and at ratios optimized for the individual cell (i.e. electrochemical system). Thus, component (f) is preferably present in amounts of greater than 0.01 percent, more preferably greater than 0.1 percent based on total weight of the composition. Component (f) is preferably present in amounts less than about 15 percent, more preferably less than about 10 percent, based on total weight of the composition. All percentages herein are weight percents based on total weight of the composition, unless explicitly indicated otherwise.

The second component (b) in the composition is an indicator dye that changes color when a change in pH occurs. Any known pH indicator dyes or their derivatives could be used. A single indicator dye may be used or they may be used in combination to give a variety of colors. The response and chromaticity of various dyes can be optimized by changing the starting pH of the system and/or the proton or hydroxide generator. Non-limiting examples of suitable indicator dyes include phenylthalein, bromocrescol purple, phenol red, ethyl red, quinaldine red, thymolthalein, thymol blue, malachite green, crystal violet, methyl violet 2B, xylenol blue, cresol red, phyloxine B, congo red, methyl orange, bromochlorophenol blue, alizarin red, chlorophenol red, 4-nitrophenol, nile blue A, aniline blue, indigo carmine, bromothymol blue, etc. Dyes that yield more than two different colors, depending on pH, are of particular interest as they would enable multi-color images with use of a single dye. Thymol blue is one example of such a dye—it is yellow under neutral conditions, red under acidic conditions, and blue under basic conditions. Dyes that are very pale or transparent in one form are also desirable as they may allow more flexibility in color selection in the display. Finally, indicator dyes, which change colors at varying pH levels and are of varying colors, may be combined to tailor the colors in the display to the users desire or to attain multi-color or possibly full color displays. The indicator dye is preferably present in amounts of at least 0.01 percent, more preferably 0.1 percent by weight. The dye is preferably used in amounts less than 15 weight percent, more preferably less than 5 weight percent. When combinations of dyes are used, the total amount of dye in the composition should preferably be less than 15 percent Other non pH sensitive dyes or pigments may be used to alter the aesthetics of the display as well, as long as the materials do not parasitically alter the redox chemistry, such that the system can no longer meet the application requirements.

The use of the pH dyes contributes to the non-linear optoelectric response preferred electrochromic materials for use in this invention. The use of pH dyes gives an optoelectronic response that is reflective of the titration curve for that dye. Thus, small amounts of current can trigger some charge transfer reaction on component (a) without creating any color charge until the threshold pH is passed. In addition, the current can be removed and as long as the pH remains above the threshold level the colored image/pixel will remain. This enables the rastering needed to create images in passive matrix devices. In place of a pH dye, the desired optoelectric response could also be obtained with a limited amount of a non-coloring buffering material. Once that material is expired, the electrochromic material would begin to be either oxidized or reduced (whichever is the case), resulting in a color response that is non-linear as a function of applied current.

Component (c) is a charge, (i.e., ion) transport material. This material may be any known material that is capable of transporting the necessary ions from the redox material to the indicator dye. However, component (c) itself does not substantially undergo a redox reaction. Examples of materials which can be used as component (c) include aqueous solutions, protic solvents, and solid electrolytes. The aqueous solutions preferably comprise electrolyte concentrations of greater than or equal to 0.01 percent and less than or equal to 50 percent and more preferably less than or equal to 0.5 percent based on weight of the solution. Suitable electrolyte components include salts, such as, for example, sodium, lithium, magnesium, or calcium sulfate, percholorate or chloride, as well as organic ionic materials, such as amines and organic acid electrolytes. Non-chloride electrolytes are preferred because chloride is fairly reactive with metal electrode surfaces. The presence of a high concentration of other ions utilizes the common ion effect to reduce the neutralization driving force of the protons and hydroxide ions, thus enhancing open circuit lifetime. Optionally, the electrolyte solution would contain one or more buffer components, depending on the operating pH range of the system. A buffer is defined as a material that resists changes in pH, as a result of addition of small amounts of acids or bases. By adding the appropriate pH buffer(s) to component (c), lifetimes may be enhanced by avoiding pH extremes at the electrodes, as previously described. Examples of buffer components include, but are not limited to: weak acids such as carboxylic acids (formate, acetate, citrate, fumaric, glycolic, oxalic, etc.), weak bases such as amines (ethylenediamine, triethylamine, etc.), or zwitterionic materials such as amino acids or biological buffers (CAPS, MES, MOPS, TAPSO, or AMPSO). In addition, components a, b, c, d, e, or f may also serve as one or more of the buffer components in the system. However, in order to optimize the response time of the system, it is preferred that none of the materials of construction buffer in the color transition range of component B. For example, component C containing a phosphate buffer, which buffers at a pH of 2.5 and 7.5, would be suitable for use with bromocresol purple, which has a color transition around 5.5. Preferably, the buffer should not negatively participate in the redox reaction.

The aqueous solution may also comprise a co-solvent. The co-solvent may be useful to enhance component solubility, modify conductivity, modify rheology of the composition and modify adhesion to the surface of the electrode layer. Potentially useful co-solvents include, but are not limited to: alcohols such as isopropanol and ethanol, aldehydes, ketones, ethers, formamides, or common electrochemical solvents such as acetonitrile, N-methylpyrolidinone, and propylene carbonate. Co-solvents with high dielectric constants and high reduction potentials (i.e., low electroactivity and low protic activity such as propylene carbonate) are particularly preferred.

A non-aqueous system could be used as component (c), provided the redox component can cause an adequate pH shift and there is adequate polarity to provide good ionic conductivity. Suitable protic solvents that could be used in a non-aqueous system include, but are not limited to: propylene carbonate, dimethyl formamide, formamide, N-methyl pyrrolidinone, acetonitrile, dimethylsulfozide, alcohols (methanol, isopropanol, ethanol, etc.), pyridine, and 1,4-dioxane. In addition, a low molecular weight glycol ether such as ethylene glycol, propylene glycol, polyethylene glycol, or a derivative therefore may be used. Non-aqueous systems are preferred when electrode corrosion, evaporative water loss, and water electrolysis become an issue. Mixed, immiscible solvents or materials, such as aqueous/organic or polymeric dispersions or microencapsulated aqueous systems may also be used to prevent contact between a corrosive aqueous electrolyte and the electrode surface. Additionally, low proton content allows the application of a greater drawing voltage (without significant system hysteresis) which speeds up kinetics.

The amount of ion/charge transport material in the system may depend upon the efficiency of the material in transporting charge and/or ions, as well as the relative amounts of additional additives (such as components (d) and (e)) that are desired. However, the amount is preferably at least 5, more preferably at least 10, and most preferably at least 20 weight percent and is less than 99.98 weight percent, more preferably less than 90 weight percent and most preferably less than 70 weight percent.

Preferably, embodiments of the composition also comprise (d) a matrix material. The matrix material may provide structural integrity to the device. This will aid printability and processability. In addition, or alternatively, the matrix material may be used to control ion transport, and diffusion rate of the other materials in the composition. Limiting ion transport and diffusion of components in the longitudinal direction increases resolution and stability over time of the image formed. Limiting ion transport and diffusion in all directions increases open circuit lifetime and optical density. Thus, according to one embodiment, the matrix material may comprise a skeletal, porous or framework structure that is saturated with the other components of the composition. For example, an open cell polymeric foam, a honeycomb structure, a screen, a mesh, spacer particles or paper may be saturated with the other components or have the other components absorbed into the open regions of the structure. Naturally and synthetically occurring polymers are particularly suitable for supplying such skeletal or porous structures. Alternatively, or in addition to a skeletal matrix material, viscosity modifier or diffusion inhibitor may be blended directly with components (a), (b), and (c). This material preferably provides consistency to the composition, as is found in a gel or a paste. Polymers and other viscosity modifiers are particularly preferred. Multiple matrix materials may also be added. For example, fumed silica is known to disrupt the crystalinity of glycol ethers, thus increasing the conductivity of the system while maintaining good structural integrity. Precise choice of such a matrix material will depend upon compatibility with the solution or solvents that are chosen. Nanocrystalline particles or sol gel systems may also be added as well to optimize the Theological properties of the system while maintaining the required transport properties. Examples of matrix materials include silicates such as silicon dioxide, aluminates, or zirconium oxide, barium titanate and other particles or polymeric materials such as, hydroxyethyl cellulose, polyethylene glycols, polyethylene oxides, polyurethanes, polyacrylates, polysulfonic acids, polyacetates, latexes, styrene divinylbenzene polymers, and polypropylenes. The matrix material is preferably present in amounts of 1 to 90 percent and more preferably 10 to 90 percent by weight. The matrix material may either be blended or polymerized/cured in-situ (i.e., photopolymerized or thermally polymerized) from its monomer. As the monomer is not polymerized, the viscosity of the material will be more like that of water, allowing the material to be easily filled into a cell or incorporated into a foam or paper, as opposed to being applied as a paste.

The matrix material may optionally contain weak acid and/or weak base end-groups, which serve to buffer the pH of the system as well. In addition, the matrix material may provide opacity to the composition. Such opacity is desirable as the electrochromic process is a surface phenomenon (occurring at the interface of the electrode and the composition). With an opaque composition providing reflection near the surface of the cell, only the first few microns at the surface must be dyed in order to see the color change. This reduces the amount of time required to generate a color change allowing switching times much faster than traditional electrochromic window displays. Optionally, in addition or instead of a matrix material, an opacifying agent (e) may be used. Suitable opacifiers include particles, such as $TiO_2$, latexes, barium titanate, and other particles. Component (e), when used, is preferably present in amount equal to or greater than 0.1 percent and more preferably greater than or equal to 1.0 percent. Component (e) is preferably present in an amount less than or equal to 75 percent by weight and more preferably less than or equal to 40 percent by weight. Component (e) may be the same as component (d). They may be the same material or materials providing a dual function of matrix and opacifier. If an opacifier is used, cross-talk causing a color change at the back electrode becomes less important as it will not usually be visible to an observer of the device.

Active layers containing pH dyes have non-linear optoelectric response curves. Unlike most electrochromic materials have linear optoelectric response curves. With a linear curve, each administration of a voltage provides a proportional color change. This linear relationship subjects most matrix addressable display devices using electrochromic materials to cross-talk. For example, if 90% of the current administered to a desired pixel reaches the pixel but 10% reaches an undesired pixel, the 10% of the current will cause a 10% color change in the undesired pixel.

Active layers containing pH dyes or other titrants could not exhibit a color change in an undesired pixel receiving 10% of the administered voltage. Because of the "s"-shaped non-linear optoelectric response curve, such as in the pH-type titration described here, an undesired pixel receiving a relatively small amount of current would not change color. The small amount of current would not liberate the amount of protons or other species required to color the pixel. Thus, non-linear optoelectric responding active layers further mitigate against cross-talk. Moreover, active layers that have non-linear optoelectric response curves can be used to build a series of images in a matrix addressable device.

The devices are easily assembled using known processes. For example, an electrode may be applied to a substrate using known methods, such as vapor deposition, electroplating, etc. The electrodes may be patterned as desired by photolithography, etching, application using a mask, etc. The active layer, if in the form of a film, may then be laminated to the substrate bearing the electrode. If the composition is a fluid or paste, it could be coated by known methods, such as blade coating, stenciling, spin coating, etc., or could be applied as a pattern via conventional drum printing, screen printing, or ink jet printing. Alternatively, the composition could be applied to a carrier substrate with an optional release film on the opposite side of the composition. The release film could be removed prior to adhering the composition to a permanent substrate comprising an electrode or pattern of electrodes.

Screen printing or stencil printing are desirable assembly methods because they involve a minimum amount of assembly steps. High viscosity electrochromatic inks of this invention can be efficiently screen or stencil printed if viscosity is controlled.

Screen printing or stencil printing electrochromic inks including preferably the compositions of this invention, can be done in several steps. The steps begin with providing an electrochromic ink preferably containing ionic species. A secondary competitive binder is then added and mixed with the electrochromic ink. Next, a gel-forming polymer in which the electrochromic ink is insoluble at room temperature is then added and mixed with the mixture of the electrochromic ink and the secondary competitive binder. That mixture is then screen printed or stencil printed onto a substrate which is heated at a temperature sufficient to cause the mixture to gel. Without wishing to be bound, applicants believe heat causes the gel-forming polymer to unwind and hydrogen bond with itself and the secondary competitive binder.

A preferred embodiment of this method comprises several steps. The first step is to dissolve an ionic electrochromic ink in a non-aqueous solvent. The next step is adding and mixing a polymer containing non-ionic viscosity modifying polymer having a number average molecular weight greater than about 20,000, preferably in the range of about 50,000 to about 100,000 from the group consisting of polyethylene oxide, polyethylene glycol, polypropylene oxide, polyvinyl alcohol, polyvinyl acetate, polyacrylamides, poly(vinyl pyrrolidone), polysaccharides, cellulose derivatives, methacrylic polymers, or poly(2-ethyl-2-oxaoline) into the mix. As a third step a low molecular weight polymer having a number average molecular weight from about 200 to about 600 from the same group of polymers as listed in step 2, is then added to the resulting mixture and mixed with it. Finally, a compound of molecular viscosity average molecular weight from about 300,000 to about 8,000,000 again selected from the group of polymers of Step 2 is added and mixed. The mixture is then applied to a substrate. The substrate is then heated at between 70 to 100 degrees C. for one to 10 minutes gelling the material resulting in a thickened, non-flowable electrochromic paste. Finally, a substrate is applied to the gelled material/substrate completing the cell.

Lower molecular weight polymer is added to prevent the gel forming polymer from gelling immediately upon addition to the electrochromic ink. These lower molecular weight materials act as secondary competitive binders. They complex with the available dye, salt, and electroactive species within the system. Thus, through the proper order of addition of species and the proper ratios of the polymers to the complexing species within the system gelation of the electrochromic material is controlled using heat. Polyethylene glycol is the preferred low molecular weight species and polyethylene oxide is the preferred intermediate and high molecular weight species.

Examples of materials which can be used as ionic species include sodium chloride, lithium magnesium chloride, or calcium sulfate, percholorate or chloride, as well as organic ionic materials, such as organic ammonium, carboxylic acid, and sulfonic acid salts. The preferred ionic species mass loading ranges from 1 to 10 percent by weight with sodium sulfate being the preferred ionic species.

EXAMPLES

Example 1

In a non-limiting example, passive device was built using small test cells, which had patterned eight 1 mm ITO lines patterned on a glass substrate, with a 0.5 mm spacer in between. The active material, which had a measured resistivity of 41,667 Ohms per centimeter was simply applied by hand and then squeezed between the orthogonal patterned rows and columns and the thickness was set using a 3 mil (75 micron) spacer. By applying 1.5V DC across a row and a column, the corresponding pixel was activated. Cross-talk was observed if the circuit was kept closed for over about a second. However, if the DC voltage was pulsed quickly (by hand) the corresponding pixel could be activated without seeing any observable cross-talk.

| Recipe for Active Material: | |
| --- | --- |
| Batch Size, gms gms of ingredient | 375 |
| Phenol Red | 13.2 |
| Hydroquinone | 26.9 |
| Titanium dioxide | 200.7 |
| Sodium Sulfate | 26.9 |
| Propylene Carbonate | 80.3 |
| Polyethylene oxide, 100K | 26.9 |

Note:
The resistivity/conductivity measurements were taken with a Corning Checkmate II Conductivity/TDS handheld meter with automatic temperature correction (TDS-total dissolved solids). The meter was first calibrated (2 points with standard conductivity/TDS solutions). The conductivity for the active material was measured by submerging the sensor probe in the material and waiting approximately 30–45 sec for a final reading. The probe was then washed and dried before making an additional measurement.

Example 2

In another non-limiting example the identical experiment of Example 1 was performed by "scoring" lines with a scalpel on 60 Ohm per square ITO-PET about 0.5 cm apart to create a functional passive display. In the case of ITO-PET printable etchant could be used as well as laser or mechanical scoring devices. This device was cut in half and the rows and columns were placed orthogonally. The active material was simply applied by hand and then squeezed between the orthogonal patterned rows and columns and the thickness was set using a 3 mil (75 micron) spacer. By applying 1.5V DC across a row and a column, the corresponding pixel was activated. Cross-talk was observed if the circuit was kept closed for over about a second. However, if the DC voltage was pulsed quickly (by hand) the corresponding pixel could be activated without seeing any observable cross-talk.

What is claimed is:

1. A matrix addressable electrochromic display device comprising
    a top electrode structure comprising at least one transparent or semi-transparent electrically conductive electrode,
    a bottom electrode structure comprising at least one, electrically conductive electrode,
    wherein at least one of the top or bottom electrode structures comprises two or more of said electrodes and the top and bottom electrode structures are positioned to form at least two separate regions where the top electrodes are positioned above the bottom electrodes and
    between the top electrode structure and the bottom electrode structure is positioned an active layer comprising an electrolyte and an electrochromic material wherein the total resistivity of the active layer is greater than 10,000 Ohms-centimeter.

2. The device of claim 1 wherein the total resistivity of the active layer is greater than 25,000 Ohms centimeter.

3. The device of claim 1 wherein the resistivity of the active layer is greater than fifty times the resistivity of the top transparent electrode.

4. The device of claim 1 wherein the resistivity of the active layer is greater than one hundred times the resistivity of the top transparent electrode.

5. The device of claim 1 wherein the active layer comprises (a) a non-aqueous compound that undergoes an electron transfer reaction with a subsequent change in its protic state resulting in a pH gradient in the device, (b) at least one indicator dye, and (c) a charge transport material.

6. The device of claim 1 wherein the active layer is a gelled material.

7. The device of claim 1 wherein the active layer is continuously present between all the electrodes in a plane.

8. The device of claim 1 wherein the active layer exhibits a non-linear optoelectric response curve.

9. The device of claim 1 wherein an image is by pulsing voltage into the electrodes.

10. A matrix addressable electrochromic display device comprising
    a top electrode structure comprising at least one transparent or semi-transparent electrically conductive electrode,
    a bottom electrode structure comprising at least one, electrically conductive electrode,
    wherein at least one of the top or bottom electrode structures comprises two or more of said electrodes and the top and bottom electrode structures are positioned to form at least two separate regions where the ton electrodes are positioned above the bottom electrodes and
    between the top electrode structure and the bottom electrode structure is positioned an active layer comprising an electrolyte and an electrochromic material and wherein the resistively of the active layer is greater than twenty timed the resisivity of the top transparent electrode.

11. A matrix addressable electrochromic display device comprising
    a top electrode structure comprising at least one transparent or semi-transparent electrically conductive electrode,
    a bottom electrode structure comprising at least one, electrically conductive electrode,
    wherein at least one of the top or bottom electrode structures comprises two or more of said electrodes and the ton and bottom electrode structures are positioned to form at least two separate regions where the ton electrodes are positioned above the bottom electrodes and
    between the top electrode structure and the bottom electrode structure is positioned an active layer comprising an electrolyte and an electrochromic material and wherein the active layer comprises component (a) a compound that undergoes an electron transfer reaction with a subsequent change in its protic state, (b) at least one indicator dye which changes color when a change in pH occurs, and (c) an ionically conductive material, and optionally component (a) a matrix material wherein (b), (c), and (d) are different from one another and component (a) preferentially undergoes the electron transfer reaction when a charge is applied to the composition and provided that if (c) is a fluid, the composition further comprises the matrix material (d).

12. The device of claim 11 characterized in that component (a) is present in an amount from 0.01 to 15 weight percent, component (b) is present in an amount from 0.01 to 15 weight percent, component (c) is present in an amount from 5 to 99.98 weight percent, component (d) is present in an amount from 0 to 90 weight percent, an opacifier component (e) is present in an amount from 0 to 75 weight percent based on total weight of the composition and component (t) a secondary redox couple present in an amount of 0 to 15 weight percent.

13. The device of claim 12 wherein the component (e) one opacifier is selected from the group consisting of titanium dioxide, latexes, and barium titanate.

14. The device of claim 11 wherein the component (f) the secondary redox couple is selected from the group consisting of iodates, bromates, sulfates, metal hydroxides, phosphates, ketones, aldehydes, quinones, quinolines, sulfur compounds, hydroxybenzenes, carboxylic acids, polyoxometallates, and amines.

15. The device of claim 11 wherein component (a) is selected from the group consisting of iodates, bromates, sulfates, metal hydroxides, phosphates, ketones, aldehydes, quinones, quinolines, sulfur compounds, hydroxybenzenes, carboxylic acids, and amines.

16. The device of claim 11 wherein component (b) comprises one or more indicator dyes selected from but not limited to the group consisting of phenylthalein, bromocrescol purple, phenol red, ethyl red, quinaldine red, thymolthalein, thymol blue, malachite green, crystal violet, methyl violet 2B, xylenol blue, cresol red, phyloxine B, congo red, methyl orange, bromochlorophenol blue, alizarin red, chlorophenol red, 4-nitrophenol, nile blue A, aniline blue, indigo carmine, and bromothymol blue.

17. The device of claim 11 wherein the matrix (d) comprises a polymer or other viscosity modifier and the matrix is blended with other components of the composition.

18. The device of claim 11 wherein the total resistivity of the active layer is greater than 1000 Ohm-centimeters.

19. The device of claim 11 wherein an image is formed by pulsing voltage into the electrodes.

20. The device of claim 11 wherein the resistively of the active layer is greater than twenty times the resistively of the top transparent electrode.

* * * * *